United States Patent
Onishi et al.

(10) Patent No.: US 7,566,287 B2
(45) Date of Patent: Jul. 28, 2009

(54) CLUTCH DEVICE FOR AUTOMATIC TRANSMISSION

(75) Inventors: Hirofumi Onishi, Aichi-gun (JP); Yuji Yasuda, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 344 days.

(21) Appl. No.: 10/590,692

(22) PCT Filed: Sep. 13, 2005

(86) PCT No.: PCT/JP2005/017221

§ 371 (c)(1),
(2), (4) Date: Jan. 17, 2007

(87) PCT Pub. No.: WO2005/030935

PCT Pub. Date: Mar. 23, 2005

(65) Prior Publication Data

US 2007/0161450 A1    Jul. 12, 2007

(30) Foreign Application Priority Data

Sep. 17, 2004   (JP)   ............................. 2004-271252

(51) Int. Cl.
*F16D 25/0635*   (2006.01)
(52) U.S. Cl. ................ 475/315; 475/321; 475/327; 192/85 AA; 192/87.11; 192/30 W; 192/70.2
(58) Field of Classification Search ................. 475/315, 475/316, 321, 322, 327, 328; 192/85 AA, 192/87.11, 30 W, 70.2, 70.12, 113.34
See application file for complete search history.

(56) References Cited

U.S. PATENT DOCUMENTS

| | | | | |
|---|---|---|---|---|
| 6,685,595 | B2 * | 2/2004 | Ohkubo et al. | ............... 475/319 |
| 7,225,726 | B2 * | 6/2007 | Onishi et al. | ................... 92/255 |
| 7,255,038 | B2 * | 8/2007 | Onishi et al. | ................... 92/255 |
| 7,296,507 | B2 * | 11/2007 | Onishi et al. | ................... 92/255 |
| 2004/0094383 | A1 | 5/2004 | Kinoshita et al. | |
| 2006/0101942 | A1 * | 5/2006 | Onishi et al. | ............... 74/665 R |

FOREIGN PATENT DOCUMENTS

| | | |
|---|---|---|
| DE | 101 49 700 | 4/2003 |
| FR | 2 745 871 | 9/1997 |
| JP | 10 339368 | 12/1998 |

* cited by examiner

*Primary Examiner*—Ha D. Ho
(74) *Attorney, Agent, or Firm*—Oblon, Spivak, McClelland, Maier & Neustadt, P.C.

(57) ABSTRACT

A clutch device for an automatic transmission, including a clutch drum supporting frictional coupling elements, a clutch piston disposed radially outwardly of the clutch drum, and a rotary speed sensor disposed radially outwardly of the clutch piston to detect a rotating speed of the clutch piston. The clutch piston has an inner spline for engagement with an outer spline of the clutch drum to prevent relative rotation between the clutch piston and the clutch drum, and further has a plurality of recesses formed in an outer circumferential surface thereof and corresponding to respective teeth of the inner spline, and a plurality of oil holes formed therethrough at an axial position of the clutch device at which the rotary speed sensor is located. The recesses and the oil holes are equally spaced apart from each other in a circumferential direction of the clutch piston.

9 Claims, 5 Drawing Sheets

CLUTCH DEVICE FOR AUTOMATIC TRANSMISSION

TECHNICAL FIELD

The present invention relates in general to a clutch device provided in an automatic transmission, and more particularly to an improvement of such a clutch device provided with a rotary speed sensor.

BACKGROUND ART

A known automatic transmission is automatically shifted to establish a selected one of its gear positions, by selective engaging and releasing actions of clutches and brakes each of which has a plurality of frictional coupling elements. The rotating speed of a rotary member of the clutch may be detected by a rotary speed sensor. For example, the rotary speed sensor is disposed to detect teeth (protrusions) and recesses (grooves) formed on an outer circumferential surface of a clutch drum which has an inner spline formed on its inner circumferential surface to support a plurality of frictional coupling elements in the form of frictional plates. The teeth and recesses defining the outer circumferential surface of the clutch drum correspond to teeth (protrusions) and recesses (grooves) of the inner spline. In this case, the rotating speed of the clutch drum is detected by the rotary speed sensor. JP-10-339368 A discloses an example of a clutch device provided with such a rotary speed sensor.

In one type of a known clutch device, a clutch piston is disposed radially outwardly of a clutch drum such that the clutch piston is axially movable relative to the clutch drum. In the clutch device of this type, the clutch piston has an inner spline which is formed on its inner circumferential surface and which engages an outer spline formed on the outer circumferential surface of the clutch drum. This clutch piston has teeth and recesses on its outer circumferential surface which correspond to the teeth and recess of the inner spline. To detect the rotating speed of the clutch piston, a rotary speed sensor is disposed radially outwardly of the clutch piston, to detect the teeth and recesses on the outer circumferential surface of the clutch piston. The inner spline of the clutch piston functions as means for preventing rotation of the clutch piston relative to the clutch drum.

Where the clutch piston has the inner spline engaging the outer spline of the clutch drum, there is a relatively large resistance to a relative axial sliding movement between the clutch piston and the clutch drum, which may prevent a smooth axial sliding movement of the clutch piston relative to the clutch drum. The axial sliding resistance may be reduced by reducing the number of teeth (the number of protrusions and recesses) of the clutch piston, but the reduction of the number of teeth gives rise to a risk of deterioration of accuracy of detection of the rotating speed of the clutch drum by the rotary speed sensor, in particular, the accuracy of detection when the rotating speed of the clutch drum is relatively low.

DISCLOSURE OF THE INVENTION

The present invention was made in the light of the background art discussed above. It is therefore an object of the present invention to provide a clutch device for an automatic transmission, which is constructed to assure high accuracy of detection of the rotating speed of its clutch piston while minimizing an axial sliding resistance between the clutch piston and the clutch drum.

The objected indicated above may be achieved according to the principle of the present invention, which provides a clutch device for an automatic transmission, comprising (a) a clutch drum supporting frictional coupling elements on an inner circumferential surface thereof, (b) a clutch piston disposed radially outwardly of the clutch drum, and (c) a rotary speed sensor disposed radially outwardly of the clutch piston and operable to detect a rotating speed of the clutch piston, wherein the clutch piston has an inner spline for engagement with an outer spline of the clutch drum to prevent relative rotation between the clutch piston and the clutch drum, and the clutch piston further has a plurality of recesses formed in an outer circumferential surface thereof and corresponding to respective teeth of the inner spline, and a plurality of oil holes formed therethrough at an axial position of the clutch device at which the rotary speed sensor is located, the recesses and the oil holes being equally spaced apart from each other in a circumferential direction of the clutch piston, and cooperating to provide a sensed portion to be sensed by the rotary speed sensor.

In the clutch device of the present invention constructed as described above, not only the recesses corresponding to the teeth of the inner spline of the clutch piston but also the oil holes formed through the clutch piston are sensed by the rotary speed sensor, so that the rotating speed of the clutch piston can be detected by the rotary speed sensor with a high degree of accuracy, without having to increase the number of teeth of the inner spline, that is, the number of the recesses corresponding to the teeth of the inner spline of the clutch piston. Thus, the use of the oil holes as well as the recesses as the sensed portion to be sensed by the rotary speed sensor permits significant reduction of the number of the teeth of the inner spline required to assure satisfactory accuracy of detection of the rotating speed of the clutch piston, making it possible to reduce the axial sliding resistance between the clutch piston and the clutch drum. Further, the oil holes function as holes for discharging a working oil, assuring high cooling efficiency of the frictional coupling elements.

In a first preferred form of this invention, the clutch drum has an inner spline formed on an inner circumferential surface thereof for engagement with the frictional coupling elements so as to prevent relative rotation between the clutch drum and the frictional coupling elements, as well as the outer spline which is formed on an outer circumferential surface thereof and which corresponds to the inner spline (70) of the clutch drum, and the plurality of recesses and the oil holes of the clutch piston are aligned with respective recesses of the outer spline of the clutch drum in the circumferential direction of the clutch device.

In the first preferred form of the invention described above, the recesses and the oil holes of the clutch piston are aligned with the respective recesses of the outer spline of the clutch drum in the circumferential direction of the clutch device. In this arrangement, the number of teeth of the inner spline of the clutch piston is smaller than the number of teeth of the outer spline of the clutch drum, by the number of the oil holes. Accordingly, the relative axial sliding resistance between the clutch piston and the clutch drum can be reduced.

In a second preferred form of this invention, each tooth of the inner spline of the clutch piston has a large-height axial portion formed in a first axial portion thereof, and a small-height axial portion formed in a second axial portion thereof and having a smaller height than the large-height axial portion.

The provision of the small-height axial portion as an axial portion of each tooth of the inner spline of the clutch piston makes it possible to further reduce the relative axial sliding resistance between the clutch piston and the clutch drum, as compared with the resistance where each tooth of the inner spline of the clutch piston is a constant-depth tooth having the same height over its entire length.

In a third preferred form of this invention, the clutch drum has a plurality of oil holes formed therethrough, and each of the oil holes of the clutch piston is located between two adjacent ones of the plurality of oil holes of the clutch drum in the circumferential direction.

In a fourth preferred form of this invention, the frictional coupling devices include a first group of frictional coupling elements having a plurality of friction plates supported by the clutch drum, and a second group of frictional coupling elements having a plurality of friction plates supported by the clutch drum, the first group of frictional coupling elements being located in a first axial portion of the clutch drum in which the above-indicated oil holes and the rotary speed sensor are located, while the second group of frictional coupling elements being located in a second axial portion of the clutch drum which is spaced from the first axial portion in an axial direction of the clutch drum.

In one arrangement of the fourth preferred form of the invention, the oil holes located in the first axial portion of the clutch drum function as a first group of oil holes, and the clutch piston further has a second group of oil holes located in the second axial portion.

The clutch device according to a fifth preferred form of this invention further comprises a first clutch hub and a second clutch hub which are disposed radially inwardly of the clutch drum and which are spaced apart from each other in the axial direction of the clutch drum. In this case, the first group of frictional coupling elements further has a plurality of friction plates supported by the first clutch hub, and the second group of frictional coupling elements further has a plurality of friction plates supported by the second clutch hub. The friction plates of the first group of frictional coupling elements supported by the clutch drum and the friction plates of the first group of frictional coupling elements supported by the first clutch hub are alternately arranged in the axial direction of the clutch drum, while the friction plates of the second group of frictional coupling elements supported by the clutch drum and the friction plates of the second group of frictional coupling elements supported by the second clutch hub are alternately arranged in the axial direction of the clutch drum.

In one arrangement of the fifth preferred form of the invention, the automatic transmission includes a ring gear which functions as the first clutch hub. In another arrangement of the fifth preferred form of the invention, the automatic transmission includes a sun gear, and the second clutch hub is fixed to the sun gear, for rotation with the sun gear.

BRIEF DESCRIPTION OF THE DRAWINGS

The above and other objects, features, advantages and technical and industrial significance of the present invention will be better understood by reading the following detailed description of a preferred embodiment of this invention, when considered in connection with the accompanying drawings, in which.

BEST MODE FOR CARRYING OUT THE INVENTION

Figure 1:
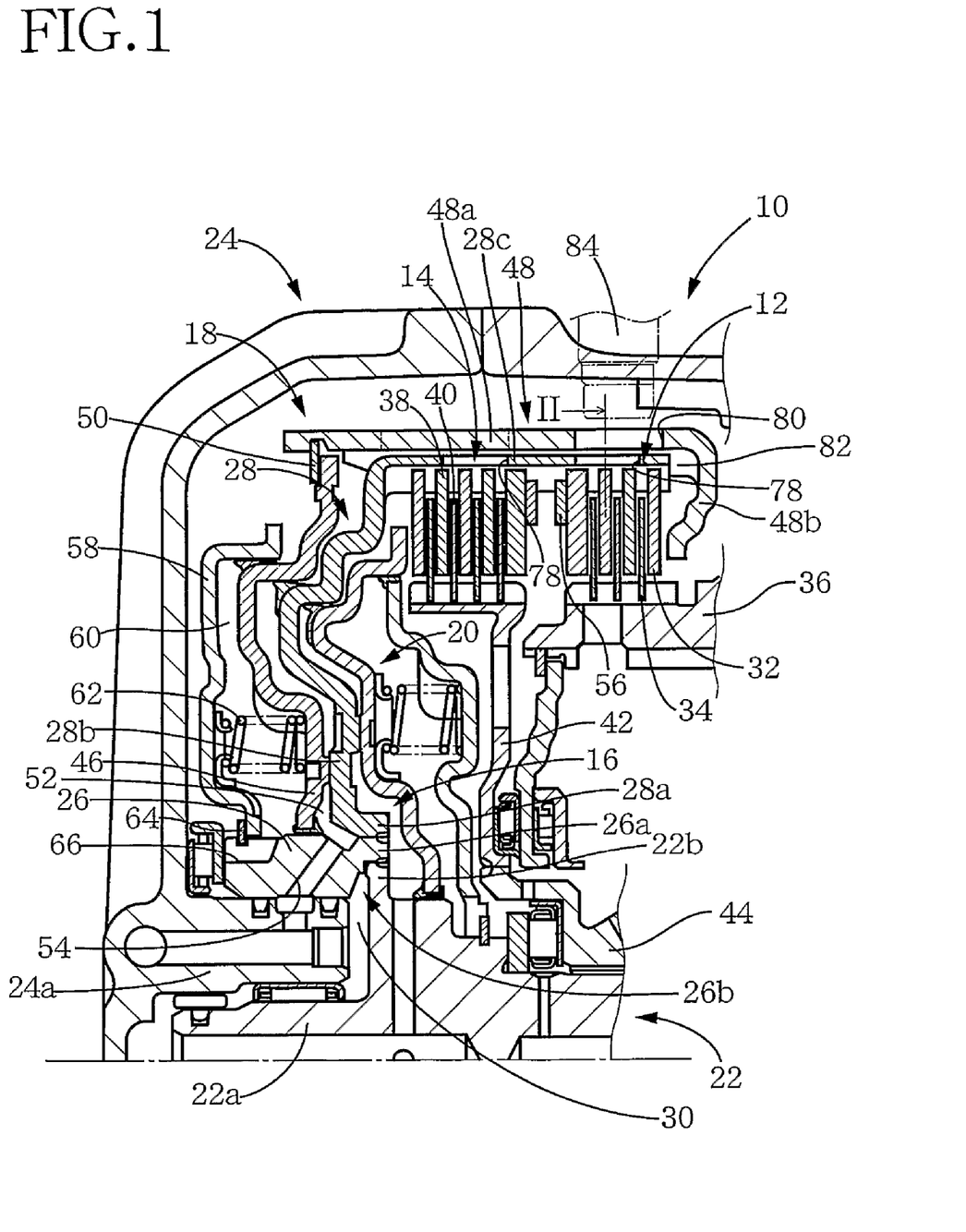
FIG. 1 is a fragmentary elevational view in cross section of a clutch device which is provided in an automatic transmission and which is constructed according to one embodiment of this invention.

Referring first to the fragmentary cross sectional view of FIG. 1, there is shown a clutch device 10 which is provided in an automatic transmission and which is constructed according to a preferred embodiment of this invention.

The clutch device 10 includes: a clutch drum 16 supporting a first group of frictional coupling elements 12 and a second group of frictional coupling elements 14; a first clutch piston 18 disposed radially outwardly of the clutch drum 16 so as to cover the clutch drum 16; and a second clutch piston 20 disposed radially inwardly of the clutch drum 16.

The automatic transmission has a casing 24, and an input shaft 22 which is rotatably supported at its end portion 22a by the casing 24. The input shaft 22 has a flange portion 22b which is located at an axial position near the end portion 22a. The flange portion 22b extends radially outwardly perpendicularly to the axis of the input shaft 22. The input shaft 22 is a turbine shaft of a torque converter driven by a drive power source such as an engine of an automotive vehicle.

The clutch drum 16 consists of a radially inner drum 26 and a radially outer drum 28. The radially inner drum 26 is a generally cylindrical member which has a substantially constant outside diameter and which is fitted on an axially extending cylindrical portion 24a of the casing 24. The radially inner drum 26 includes a thin-walled axial end portion 26a on the side of the second clutch piston 20. The inner circumferential surface of the radially inner drum 26 has a tapered and stepped portion 26b which is adjacent to the axial end portion 26a. The tapered part of the tapered and stepped portion 26b has an inside diameter which increases in an axial direction of the inner drum 26 toward the axial end portion 26a. The thin-walled axial end portion 26a has an end face which is flush with one of opposite surfaces of the flange portion 22b of the input shaft 22 which is on the side of the second clutch piston 20. The radially inner drum 26 and the input shaft 22 are welded to each other at the outer circumferential surface of the flange portion 22b and the inner circumferential surface of the axial end portion 26a. The flange portion 22b of the input shaft 22 and the tapered and stepped portion 26b of the axial end portion 26a of the radially inner drum 26 cooperate to partially define an oil reservoir 30, which is formed radially inwardly of the tapered and stepped portion 26b.

The radially outer drum 28 is a cylindrical member consisting of an inner cylindrical portion 28a, an outer cylindrical portion 28c, and an annular bottom portion 28b which connects the corresponding axial ends of the inner and outer cylindrical portions 28a, 28c. The radially outer drum 28 is closed at one axial end by the annular bottom portion 28b and is open at the other axial end.

The inner cylindrical portion 28a is fitted on the thin-walled axial end portion 26a of the radially inner drum 26, and the end face of the inner cylindrical portion 28a which is on the side of the second clutch piston 20 is flushed with the corresponding end face of the axial end portion 26a. The radially outer and inner drums 26, 28 are welded to each other at the inner circumferential surface of the inner cylindrical portion 28a and the outer circumferential surface of the axial end portion 26a. Accordingly, the radially outer drum 28 as well as the radially inner drum 26 is rotated with the input shaft 22.

The annular bottom portion 28b of the radially outer drum 28 extends generally in the radial direction of the input shaft 22, and is connected at its radially inner end to the axial end of the inner cylindrical portion 28a which is on the side of the first clutch piston 18. The outer cylindrical portion 28c extends from the radially outer end of the annular bottom portion 28b in the axial direction away from the first clutch piston 16. The outer cylindrical portion 28c holds a plurality of inwardly extending friction plates 32 of the first group of frictional coupling elements 12, and a plurality of inwardly extending friction plates 38 of the second group of frictional coupling elements 14, such that the friction plates 32 are splined to a portion of the inner circumferential surface of the outer cylindrical portion 28c, which portion is relatively near the axial open end of the outer cylindrical portion 28c, and such that the friction plates 38 are splined to a portion of the inner circumferential surface which is relatively near the annular bottom portion 28b and relatively remote from the above-indicated axial open end. The friction plates 32, 38 extend from the inner circumferential surface of the outer cylindrical portion 28c in the radially inward direction of the clutch drum 16.

Described in detail by reference to the cross sectional view of FIG. 2 taken in the arrow II of FIG. 1, the outer cylindrical portion 28c of the radially outer drum 28 has an inner spline 70 formed by pressing on its inner circumferential surface. The inwardly extending friction plates 32, 38 (not shown in FIG. 2) are held in engagement with the inner spline 70. The outer cylindrical portion 28c further has an outer spline 72 on its outer circumferential surface, which has protrusions and recesses corresponding to protrusions and recesses of the inner spline 70. The outer cylindrical portion 28c having the inner and outer splines 70, 72 has large-diameter portions 74 and small-diameter portions 76 which are formed alternately in the circumferential direction. The large-diameter portion 74 have respective oil holes 78 formed therethrough in the radial direction, at axial positions corresponding to the friction plates 32, 38. The oil holes 76 shown in FIG. 2 correspond to the third friction plate 32 as counted in the axial direction from the open end toward the closed end of the radially outer drum 28.

Referring back to FIG. 1, the first group of frictional coupling elements 12 consist of the above-indicated inwardly extending friction plates 32 and a plurality of outwardly extending friction plates 34 which are alternately arranged in the axial direction of the clutch drum 16. Similarly, the second group of frictional coupling elements 14 consist of the above-indicated inwardly extending friction plates 38 and a plurality of outwardly extending friction plates 40 which are alternately arranged in the axial direction. The outwardly extending friction plates 34 of the first group of frictional coupling elements 12 are splined to the outer circumferential surface of a ring gear 36 of the automatic transmission which functions as a first clutch hub. The outwardly extending friction plates 40 of the second group of frictional coupling elements 14 are splined to the outer circumferential surface of a second clutch hub 42. The clutch hub 42 is fixedly fitted at its inner circumferential surface on a sun gear 44 which is fixedly fitted on the input shaft 22, so that the clutch hub 42 is rotated with the sun gear 44.

The first clutch piston 18 consists of annular bottom plate 46, a piston member 48 connected to at one axial end thereof to the radially outer end of the annular bottom plate 46 and covering the outer cylindrical portion 28c of the radially outer drum 28, and a stopper ring 50 fixed to the piston member 48 to prevent an axial movement of the piston member 48 relative to the annular bottom plate 46 toward the outer cylindrical portion 28c.

The annular bottom plate 46 of the first clutch piston 18 is axially slidable at its inner circumferential surface on the radially inner drum 26. The annular bottom plate 46 and the annular bottom portion 28b of the radially outer drum 28 cooperate to define a first oil chamber 52 to which a working oil is fed through an oil passage 54 formed through the radially inner drum 26.

On one of opposite axial sides of the annular bottom plate 46 which is remote from the first oil chamber 52, there is disposed a balancer 58 such that the balancer 58 is fitted at its inner circumferential surface on the outer circumferential surface of the radially inner drum 26. The balancer 58 cooperates with the annular bottom plate 46 of the first clutch piston 18 to define a second oil chamber 60. A return spring 62 is interposed between the balancer 58 and the annular bottom plate 46, to bias the balancer 58 and annular bottom plate 46 in opposite axial directions away from each other. The axial position of the balancer 58 biased by the return spring 62 in the axial direction away from the first clutch piston 18 is determined by abutting contact of the balancer 58 at its radially inner end portion with a retainer ring 64 fixed to the outer circumferential surface of the radially inner drum 26.

The radially inner drum 26 has an oil passage (not shown) for communication between the second oil chamber 60 and the oil reservoir 30, so that the working oil is introduced into the second oil chamber 60 through this oil passage. Accordingly, the second oil chamber 60 functions as a chamber for canceling a centrifugal hydraulic pressure developed in the first oil chamber 52. The working oil is discharged from the second oil chamber 60 into a space on the axial side of the balancer 58 remote from the second oil chamber 60, through an axial groove 66 formed an axial portion of the radially inner drum 26 on which the balancer 58 is fitted.

The piston member 48 of the first clutch piston 18 is formed by pressing, and consists of a cylindrical portion 48a disposed radially outwardly of the outer cylindrical portion 28c of the radially outer drum 28, and an annular portion 48b formed to extend from one axial end of the cylindrical portion 48a which is remote from the annular bottom plate 46. The annular portion 48b extends generally in the radially inward direction and is inclined in the axial direction toward the first group of frictional coupling elements 12, such that the radially inner end of the annular portion 48b is opposed to the nearest friction plate 32 of the first group of frictional coupling elements 12. The outer cylindrical portion 28c of the radially outer drum 28 has a retainer ring 56 fixed its inner circumferential surface to prevent an axial movement of the first group of frictional coupling elements 12 toward the second group of frictional coupling elements 14.

The cylindrical portion 48a of the first clutch piston 18 has oil holes 80 formed through its wall thickness, and an inner spline 82 engaging the outer spline 72 formed on the outer cylindrical portion 28c of the radially outer drum 28. The inner spline 82 and the outer spline 72 cooperate to prevent the first clutch piston 18 and the clutch drum 16 from rotating relative to each other. As shown in FIG. 1, the oil holes 80 are located at an axial position of the outer cylindrical portion 28c at which the first group of frictional coupling elements 12 is located. The working oil which has lubricated the frictional coupling elements 12 is discharged through the oil holes 80 into a space radially outward of the cylindrical portion 48a. The casing 24 holds a rotary speed sensor 84 as indicated by one-dot chain lines in FIGS. 1 and 2. The rotary speed sensor 84 is located radially outwardly of the cylindrical portion 48a of the piston member 48, and is located at the same axial position as the oil holes 80, as is apparent from FIG. 1. The rotary speed sensor 84 has a sensing portion located near the cylindrical portion 48a of the piston member 48, and detects the rotating speed of the piston member 48, by sensing the passage of protrusions and recesses of the piston member 48. For example, the sensing portion of the rotary speed sensor 84 uses a hole detecting element.

Figure 3:
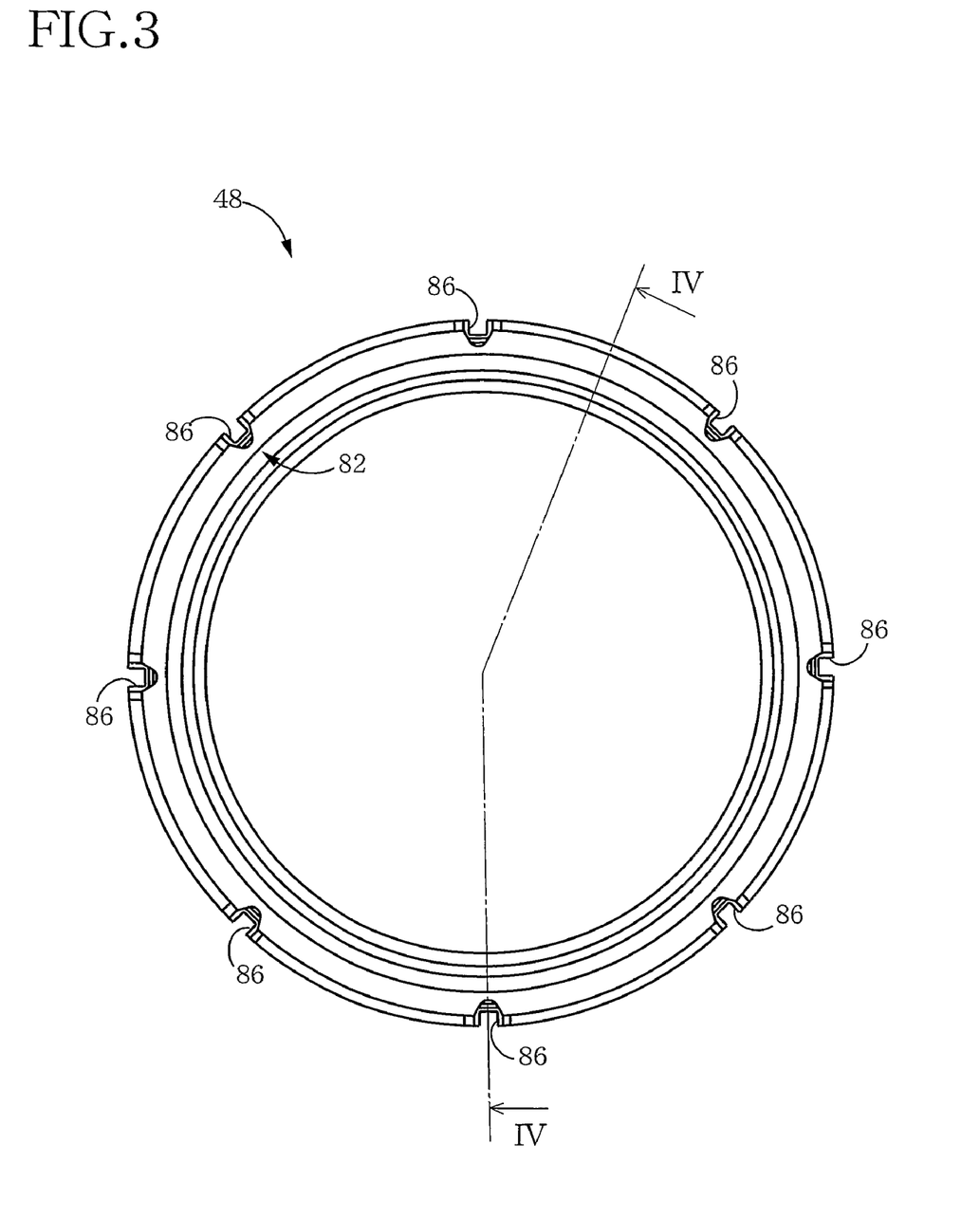
FIG. 3 is a view of a piston member taken in its axial direction on the side of a balancer.

The piston member 48 of the first clutch piston 18 will be described in detail by reference to the view of FIG. 3 showing the piston member as seen its axial direction on the side of the side of the balancer 48, the cross sectional view of FIG. 4 taken along line IV-IV of FIG. 3, and the view of FIG. 5 taken in a direction indicated by arrow V of FIG. 4. In the present embodiment, the inner spline 82 formed on the piston member 48 has only eight teeth, and the piston member 48 has eight recesses 86 formed in its outer circumferential surface such that the eight recesses 86 correspond to the eight teeth of the inner spline 82 and are equally spaced apart from each other in the circumferential direction, as shown in FIG. 3. These recesses 86 and the above-described oil holes 80 cooperate to provide a sensed portion of the piston member 48 to be sensed by the rotary speed sensor 84.

Figure 5:
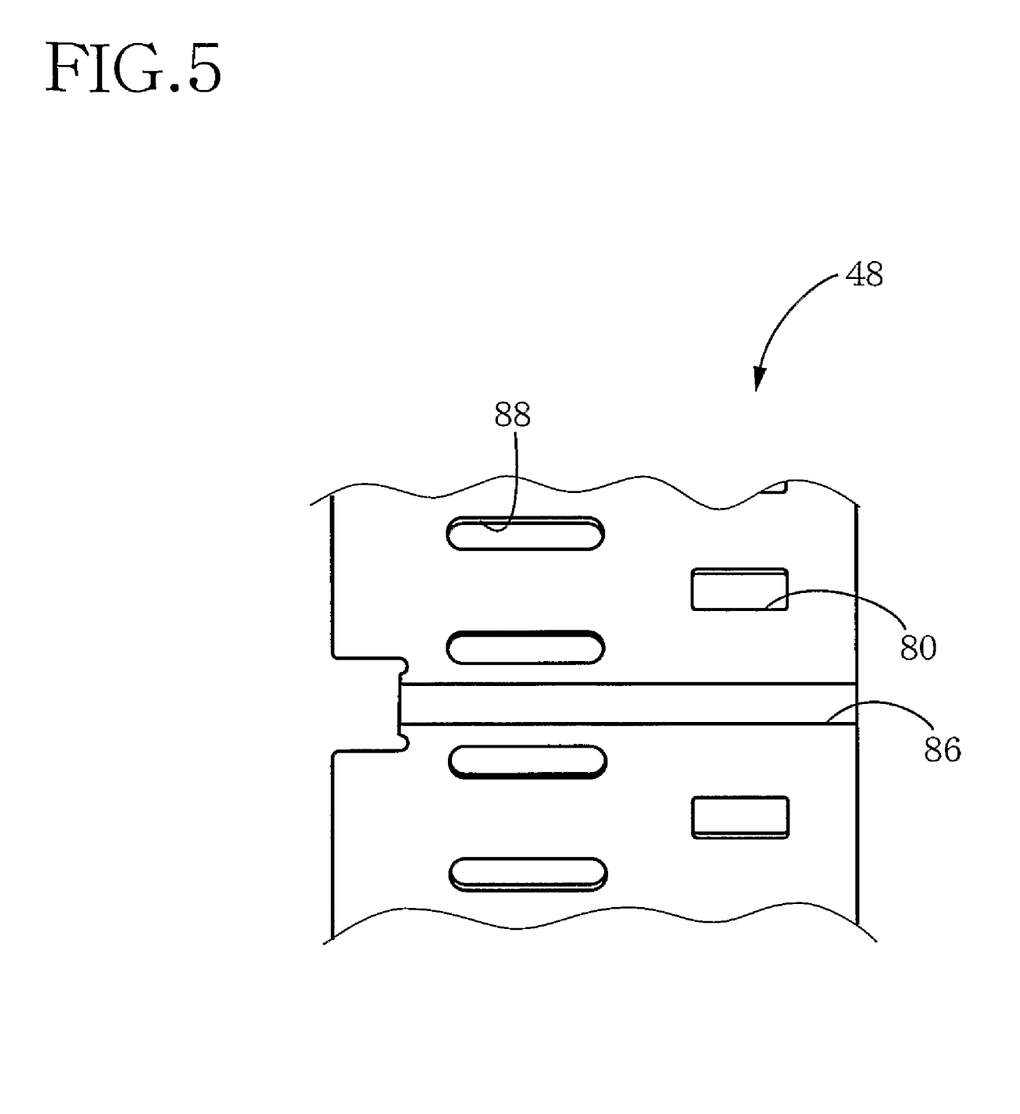
FIG. 5 is a view taken in a direction indicated by arrow V of FIG. 4.

As shown in FIG. 5, the piston member 48 has oil holes 88 formed through its wall thickness, in addition to the oil holes 80 located at the axial position of the first group of frictional coupling elements 12. Each of the oil holes 80 of the cylindrical portion 48a of the clutch piston 18 is located between the adjacent two oil holes 78 of the outer cylindrical portion 28c of the clutch drum 16, in the circumferential direction of the cylindrical portions 48a, 28c. The oil holes 88 are located at an axial portion of the outer cylindrical portion 28c of the radially outer drum 28 at which the second group of frictional coupling elements 14 is located. The oil holes 80 are spaced from each other in the circumferential direction of the piston member 48, and the oil holes 88 are similarly spaced from each other in the circumferential direction. As shown in FIG. 2, the oil holes 80 are aligned in the circumferential direction of the piston member 48, with respective recesses 72a of the outer spline 72 formed in the outer cylindrical portion 28c of the radially outer drum 28 of the clutch drum 16, except the recesses 72a of the outer spline 72 which are aligned with the recesses 86 (teeth) of the inner spline 82 of the piston member 48. A distance between each recess 86 and the adjacent oil holes 80 in the circumferential direction of the piston member 48 is equal to a distance between the adjacent oil holes 80 in the circumferential direction of the piston member 48. Therefore, the recesses 86 and oil holes 80 are equally spaced apart from each other in the circumferential direction of the first clutch piston 18.

The oil holes 88 formed radially outwardly of the second group of frictional coupling elements 14 are aligned in the circumferential direction of the piston member 48, with the oil holes 78 formed through the large-diameter portions 74 of the outer cylindrical portion 28c of the radially outer drum 28.

Figure 4:
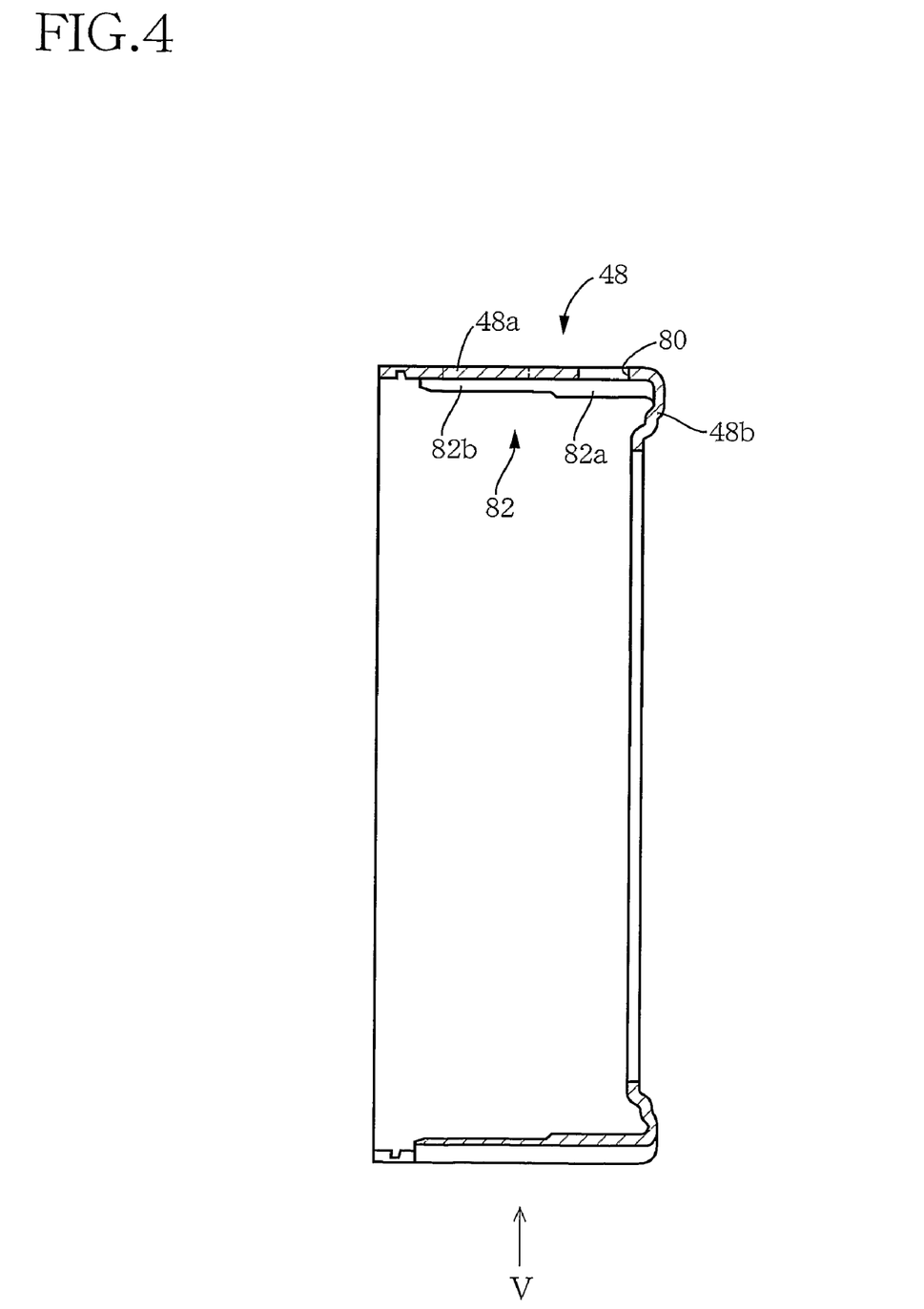
FIG. 4 is a cross sectional view taken along line IV-IV of FIG. 3.

Each tooth of the inner spline 82 of the piston member 48 consists of a large-height portion 82a, and a small-height axial portion 82b continuous with the large-height axial portion 82a and having a smaller height or amount of protrusion than the large-height axial portion 82a, as shown in FIG. 4. In the present embodiment, the large-height axial portion 82a is formed in a first axial portion of the cylindrical portion 48a on the side of the annular portion 48b, while the small-height axial portion 82b is formed in a second axial portion of the cylindrical portion 48a on the side of the annular bottom plate 46 of the first clutch piston 18. The inner spline 82 may be formed by a two-stage pressing operation consisting of two press-forming steps.

Figure 2:
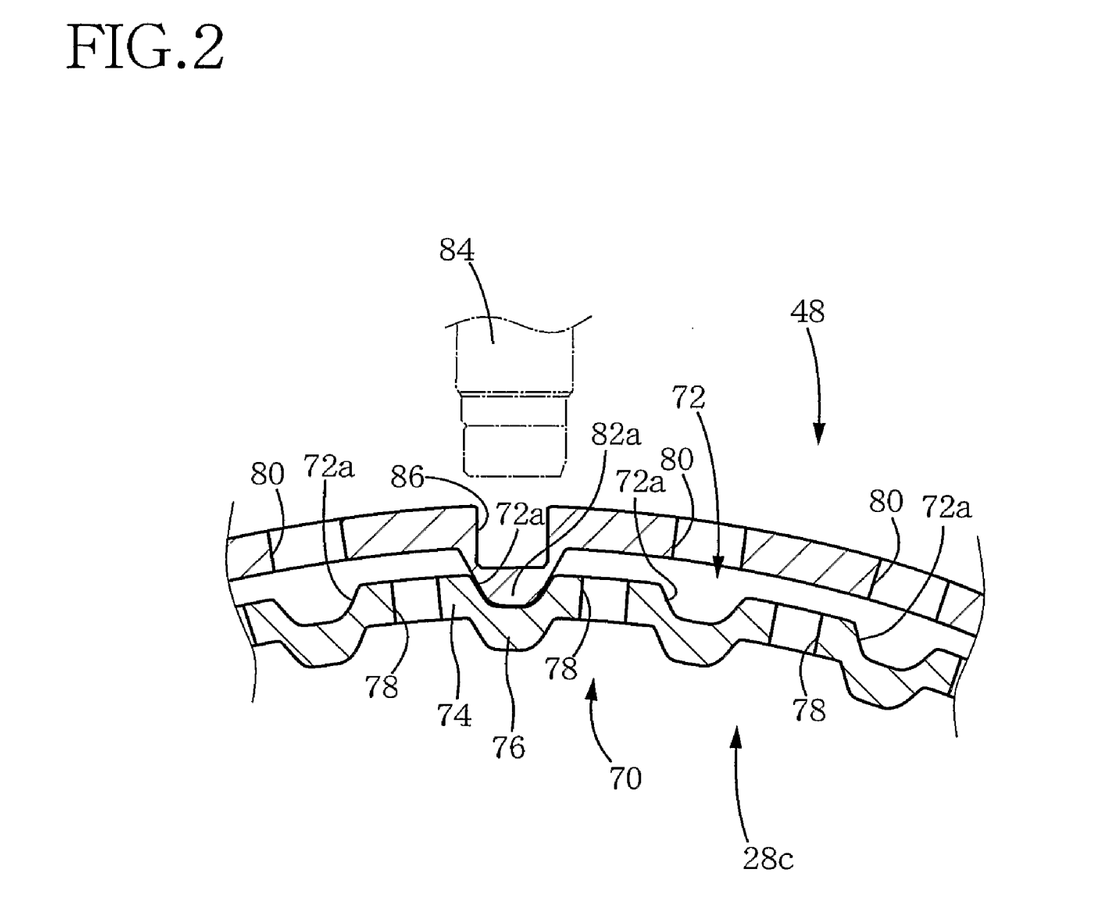
FIG. 2 is a cross sectional view taken in a direction indicated by arrow II of FIG. 1.

The large-height axial portion 82a of the inner spline 82 of the piston member 48 is formed for engagement with the corresponding recess 72a of the outer spline 72 formed on the outer cylindrical portion 28c of the radially outer drum 28 of the clutch drum 16, that is, with the small-diameter portion 76 of the outer cylindrical portion 28c, as shown in FIG. 2. On the other hand, the small-height axial portion 82b having a smaller height than the large-height axial portion 82a is spaced apart from the bottom of the corresponding recess 72a of the outer spline 72, so that the resistance to a sliding movement of the cylindrical portion 48a relative to the outer spline 72 is lower at the small-height axial portion 82b than at the large-height axial portion 82a. The sliding resistance of the cylindrical portion 48a with respect to the outer spline 62 can be favorably reduced by increasing the axial length of the small-height axial portion 82b. On the other hand, an increase of the axial length of the small-height axial portion 82b undesirably reduces an axial length of engagement of the large-height axial portion 82a of the piston member 48 and the outer spline 72 of the outer cylindrical portion 28c of the clutch drum 16, and undesirably shifts the gravity center of the piston member 48 toward the annular portion 48b, resulting in reducing the stability of axial sliding movement of the piston member 48 relative to the radially outer drum 28 of the clutch drum 16. The axial length of the small-height axial portion 82b is determined by taking account of the sliding resistance and stability of sliding movement of the piston member 46 relative to the radially outer drum 28.

In the present clutch device 10 which has been described above, not only the recesses 86 corresponding to the teeth of the inner spline 82 of the cylindrical portion 48 but also the oil holes 80 formed through the cylindrical portion 48 are sensed by the rotary speed sensor 84, so that the rotating speed of the first clutch piston 18 can be detected by the rotary speed sensor 84 with a high degree of accuracy, without having to increase the number of teeth of the inner spline 82, that is, the number of the recesses 86 corresponding to the teeth of the inner spline 82. Thus, the use of the oil holes 80 as well as the recesses 86 as the sensed portion to be sensed by the rotary speed sensor 84 permits significant reduction of the number of the teeth of the inner spline 82 required to assure satisfactory accuracy of detection of the rotating speed of the first clutch piston 18, making it possible to reduce the axial sliding resistance between the first clutch piston 18 and the clutch drum 16. Further, the oil holes 80 function as holes for discharging the working oil, assuring high cooling efficiency of the first group of frictional coupling elements 12.

The clutch device 10 is further advantageous in that the small-height hallow-groove axial portion 82b of each tooth of the inner spline 82 formed over a predetermined axial length of the inner spline 82 is effective to further reduce the axial sliding resistance between the first clutch piston 18 and the clutch drum 16, owing to the spaced-apart relationship of the shallow-groove axial portion 82b with the bottom of the recesses 72a of the outer spline 72 of the outer cylindrical portion 28c.

While the preferred embodiment of this invention has been described in detail by reference to the accompanying drawings, for illustrative purpose only, it is to be understood that the present invention is not limited to the details of the preferred embodiment, but may be embodied with various changes, modifications and improvements which may occur to those skilled in the art, in the light of the foregoing teachings.

In the illustrated embodiment, each tooth of the inner spline 82 consists of the two parts, namely, the large-height axial portion 82a and the small-height axial portion 82b. However, each tooth of the inner spline 82 may be a constant-height tooth having a constant height or amount of protrusion over its entire length. In this case, too, the relatively small number (i.e., eight) of teeth (recesses 86) of the inner spline 82 assures a low axial sliding resistance between the first clutch piston 18 and the clutch drum 16.

The invention claimed is:

1. A clutch device for an automatic transmission, comprising:
   (a) a clutch drum supporting frictional coupling elements on an inner circumferential surface thereof,
   (b) a clutch piston disposed radially outwardly of the clutch drum, and
   (c) a rotary speed sensor disposed radially outwardly of the clutch piston and operable to detect a rotating speed of the clutch piston, wherein:
   said clutch piston has an inner spline for engagement with an outer spline of said clutch drum to prevent relative rotation between said clutch piston and said clutch drum; and
   said clutch piston further has a plurality of recesses formed in an outer circumferential surface thereof and corresponding to respective teeth of said inner spline, and a plurality of oil holes formed therethrough at an axial position of the clutch device at which said rotary speed sensor is located, said recesses and said oil holes being equally spaced apart from each other in a circumferential direction of said clutch piston, and cooperating to provide a sensed portion to be sensed by said rotary speed sensor.

2. The clutch device according to claim 1, wherein said clutch drum has an inner spline formed on an inner circumferential surface thereof for engagement with said frictional coupling elements so as to prevent relative rotation between said clutch drum and said frictional coupling elements, as well as said outer spline which is formed on an outer circumferential surface thereof and which corresponds to said inner spline of said clutch drum,
   and wherein said plurality of recesses and said oil holes of said clutch piston are aligned with respective recesses of said outer spline of said clutch drum in said circumferential direction.

3. The clutch device according to claim 1, wherein each tooth of said inner spline has a large-height axial portion formed in a first axial portion thereof, and a small-height axial portion formed in a second axial portion thereof and having a smaller height than said large-height axial portion.

4. The clutch device according to claim 1, wherein said clutch drum has a plurality of oil holes formed therethrough, and each of said oil holes of said clutch piston is located between two adjacent ones of said plurality of oil holes of said clutch drum in said circumferential direction.

5. The clutch device according to claim 1, wherein said frictional coupling elements include a first group of frictional coupling elements having a plurality of friction plates supported by said clutch drum, and a second group of frictional coupling elements having a plurality of friction plates supported by said clutch drum, said first group of frictional coupling elements being located in a first axial portion of said clutch drum in which said oil holes and said rotary speed sensor are located, while said second group of frictional coupling elements being located in a second axial portion of said clutch drum which is spaced from said first axial portion in an axial direction of said clutch drum.

6. The clutch device according to claim 5, wherein said oil holes located in said first axial portion of said clutch drum function as a first group of oil holes, and said clutch piston further has a second group of oil holes located in said second axial portion.

7. The clutch device according to claim 5, further comprising a first clutch hub and a second clutch hub which are disposed radially inwardly of said clutch drum and which are spaced apart from each other in said axial direction of said clutch drum, and wherein said first group of frictional coupling elements further has a plurality of friction plates supported by said first clutch hub, and said second group of frictional coupling elements further has a plurality of friction plates supported by said second clutch hub,
   and wherein the friction plates of said first group of frictional coupling elements supported by said clutch drum and the friction plates of said first group of frictional coupling elements supported by said first clutch hub are alternately arranged in said axial direction of said clutch drum, while the friction plates of said second group of frictional coupling elements supported by said clutch drum and the friction plates of said second group of frictional coupling elements supported by said second clutch hub are alternately arranged in said axial direction of said clutch drum.

8. The clutch device according to claim 7, wherein said automatic transmission includes a ring gear which functions as said first clutch hub.

9. The clutch device according to claim 7, wherein said automatic transmission includes a sun gear, and said second clutch hub is fixed to said sun gear, for rotation with said sun gear.

* * * * *